(12) United States Patent
Verbitski et al.

(10) Patent No.: US 9,405,816 B2
(45) Date of Patent: Aug. 2, 2016

(54) RECONCILIATION OF GEO-REPLICATED DATABASE CLUSTERS

(71) Applicant: Microsoft Corporation, Redmond, WA (US)

(72) Inventors: Alexandre Verbitski, Woodinville, WA (US); Hao Xia, Redmond, WA (US); Santeri Voutilainen, Seattle, WA (US); Tomas Talius, Sammamish, WA (US); Michael Nelson, Redmond, WA (US); Sree Kuchibhotla, San Francisco, CA (US); Vishrut Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 662 days.

(21) Appl. No.: 13/784,825

(22) Filed: Mar. 5, 2013

(65) Prior Publication Data

US 2014/0258229 A1   Sep. 11, 2014

(51) Int. Cl.
*G06F 17/30* (2006.01)
(52) U.S. Cl.
CPC ................................ *G06F 17/30578* (2013.01)
(58) Field of Classification Search
CPC ................................................ G06F 17/30578
USPC .................................................. 707/625, 634
See application file for complete search history.

(56) References Cited

U.S. PATENT DOCUMENTS

| | | | |
|---|---|---|---|
| 5,781,912 A | 7/1998 | Demers et al. | |
| 5,878,434 A | 3/1999 | Draper et al. | |
| 6,321,236 B1 * | 11/2001 | Zollinger | G06F 17/30581 |
| 6,578,054 B1 * | 6/2003 | Hopmann | G06F 17/30578 707/625 |
| 7,065,538 B2 | 6/2006 | Aronoff et al. | |
| 7,072,911 B1 * | 7/2006 | Doman | G06F 17/30575 707/615 |
| 7,587,428 B2 | 9/2009 | Barabas et al. | |
| 8,001,079 B2 | 8/2011 | Lu et al. | |
| 2003/0037020 A1 * | 2/2003 | Novak | G06F 17/30575 |
| 2003/0093431 A1 * | 5/2003 | Cooke | G06F 17/30578 |
| 2004/0044799 A1 * | 3/2004 | Sivaraman | G06F 17/30578 709/253 |
| 2007/0299887 A1 * | 12/2007 | Novik | G06F 17/30578 |
| 2009/0070237 A1 | 3/2009 | Lew et al. | |
| 2009/0135346 A1 * | 5/2009 | Kajita | G02F 1/134363 349/96 |
| 2013/0325803 A1 * | 12/2013 | Akirav | G06F 17/30578 707/634 |

OTHER PUBLICATIONS

Article entitled "Introducing Geo-replication for Windows Azure Storage", by Microsoft, dated Sep. 15, 2011.*

(Continued)

*Primary Examiner* — Mahesh Dwivedi
(74) *Attorney, Agent, or Firm* — Aneesh Mehta; Katherine Drakos; Micky Minhas (57) ABSTRACT

A database associated with a primary database cluster may be replicated in a backup database cluster located in a different location in order to provide a highly-available fault tolerant database service. The databases are reconciled through a cluster management module distributed in each database cluster. The cluster management module uses a set of reconciliation data structures to track locally the reconciled states of each database in each database cluster, the operations made locally to the databases in each database cluster, and the author of the operations. The cluster management module in each database cluster engages in a stateless messaging protocol using the set of reconciliation data structures to determine whether or not the databases may be reconciled.

20 Claims, 9 Drawing Sheets

(56) References Cited

OTHER PUBLICATIONS

"Business Continuity in Windows Azure SQL Database", Retrieved at <<http://msdn.microsoft.com/en-us/library/windowsazure/hh852669.aspx>>, Retrieved Date : Nov. 26, 2012, pp. 11.

"Cloud computing disaster recovery", Retrieved at <<http://www.hostway.com/resources/media/disaster-recovery-in-the-cloud.pdf>>, Retrieved Date : Nov. 26, 2012, pp. 11.

Sovran, et al., "Transactional storage for geo-replicated systems", Retrieved at <<http://www.cs.cornell.edu/courses/cs6452/2012sp/papers/psi-sospl 1.pdf>>, In the proceeding of the Twenty-Third ACM Symposium on Operating Systems Principles, Oct. 23, 2011, pp. 16.

"Partial Synchronization with Data Sync Service", Published on: Jul. 7, 2010, pp. 3, Available at: https://azure.microsoft.com/en-us/blog/partial-synchronization-with-data-sync-service/.

"Introduction to Data Sync Service for SQL Azure", Published on: Jul. 6, 2010, pp. 5, Available at: https://azure.microsoft.com/en-us/blog/introduction-to-data-sync-service-for-sql-azure/.

Leake, Gregory, "Announcing the New SQL Azure Data Sync CTP Release", Published on: Oct. 11, 2011, pp. 5, Available at: https://azure.microsoft.com/en-us/blogiannouncing-the-new-sql-azure-data-sync-ctp-release/.

"Synchronizing SQL Azure", Published on: Oct. 21, 2011, pp. 1, Available at: http://web.archive.org/web/20111021052525/http://msdn.microsoft.com/en-us/library/ff928514(v=SQL.110).aspx.

Myers, Walter, "Field Note: Using Certificate-Based Encryption in Windows Azure Applications", Published on: Sep. 7, 2011, pp. 10, Available at: https://azure.microsoft.com/en-us/blog/field-note-using-certificate-based-encryption-in-windows-azure-applications/.

Fultz, Joseph, "Forecast: Cloudy—Branch-Node Synchronization with SQL Azure", Published on: Jan. 2011, pp. 10, Available at: ittps://msdn.microsoft.com/en-us/magazine/gg535668.aspx.

Hoffman, Joshua, "Cloud Computing: An Introduction to SQL Azure", Published on: Oct. 2010, pp. 3, Available at: https://technet.microsoft.com/en-us/magazine/gg312148.aspx.

"Replication for Microsoft SQL Server Version 7.0", Published on: Jul. 11, 1998, pp. 13, Available at: https://msdn.microsoft.com/en-us/library/aa226168(v=sql.70).aspx.

Sovran, et al., "Transactional Storage for Geo-Replicated Systems", In the proceeding of the Twenty-Third ACM Symposium on Operating Systems Principles, Oct. 23, 2011, pp. 385-400.

\* cited by examiner

RECONCILIATION OF GEO-REPLICATED DATABASE CLUSTERS

BACKGROUND

A database service strives for high availability, scalability and disaster recovery so that the database service is available continuously without failure. In order to provide continuous service, the database service may utilize multiple servers which are grouped into a cluster. The servers in a cluster work together to increase the availability of applications and services hosted on a server. Each database hosted in the database service may be replicated in one or more servers so that when failures occur in one server, a backup server is available to take its place.

A database within a cluster may be replicated at a different geographic location ("geo-replicated"). In the event of a disaster at one geographic location, a backup cluster at another geographic location can take over for the failed cluster. In order to ensure consistency between the databases, the databases have to be replicated in the same manner across the geographic locations. A coordination infrastructure may be used to ensure data consistency of the databases between the clusters. However, the coordination infrastructure also has to ensure that the databases are consistent at each geo-replicated site and that operations affecting the state of the databases are executed in the same order at each site.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A high-availability database service replicates a database within one cluster to a different cluster, possibly in a different location, in order to ensure continuous service in the event of a failure. A primary database may establish a relationship with a secondary or backup database so that the secondary database is synchronized with the primary database. For a pair of databases, the primary database is considered to be located in the primary cluster and the secondary database is considered to be located in the secondary cluster. In one or more embodiments, the primary and secondary cluster may be the same cluster. A user may perform operations on the database in the primary cluster and/or the secondary cluster independently and concurrently, thereby requiring the databases in both clusters to be reconciled to a synchronous state.

Each cluster utilizes a cluster management module to determine whether or not changes made to one or more databases on one cluster may be reconciled with the database's replicated counterpart. Each cluster management module utilizes a set of reconciliation data structures to track locally the last and previous states of a database, changes made locally since the last reconciliation, and the author (e.g., user or system) of such changes.

The clusters communicate by exchanging messages within a session through a stateless messaging protocol. The messages implement a reconciliation determination protocol that determines whether or not operations made to databases of each cluster may be reconciled. For each database pair, a reconciliation request from one cluster sends its set of reconciliation data structures to the cluster hosting the replicated database. The cluster management module at the counterpart cluster analyzes the reconciliation data structures in order to determine whether or not it may incorporate the changes so that both databases are synchronized or whether the geo-replication relationship between the database pair should be suspended.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments pertain to a technology for determining whether replicated databases may be reconciled to a synchronous state. A high-availability database service requires continuous service despite failures. For this reason, one or more databases within a cluster may be replicated at another location. The replication of a database is done by establishing a relationship between at least two databases. The relationship may deem one database as the primary database and the second database as the secondary or backup database. When changes are made to one or more databases in a cluster, the cluster informs the related counterpart cluster so that the same changes may be applied to the replicated databases in that cluster.

However, it may not be possible to reconcile the two databases in all situations. In the event of the unavailability of the primary database, a user and/or system administrator may change the role of the secondary database to take on the role of the primary database. The secondary database, acting as the primary database, may make changes without reconciling those changes with the unavailable database. When the unavailable database becomes available, the databases in the replicated relationship need to be synchronized which may not be possible.

In the event of a communication link failure, a user may force operations to be performed on one database without reconciling the operations on the related database. The number of operations performed without reconciliation may prevent the two related databases from being reconciled. A system administrator may perform operations on the primary and/or secondary database independently and concurrently with the user and/or system performing operations on either database thereby complicating the reconciliation process. In these situations and others, it may not be possible to reconcile the two databases and this determination needs to be made prior to any attempt to synchronize the databases.

A database cluster or cluster may have an internal management infrastructure that controls storage and access of data within the databases in the cluster. The internal management infrastructure is a centralized control point that is a single point of failure, in the event of a natural disaster, catastrophe, network failure, server crash, and so forth. By contrast, the databases in a cluster are reconciled or synchronized by a messaging protocol that is managed by a cluster management module that is distributed in each database cluster. Therefore, the infrastructure that manages the reconciliation of the databases is not under a central control, as in the case of the internal management infrastructure, rather it is distributed to each cluster so there is no single point of failure.

The clusters communicate by exchanging messages within a session through a stateless messaging protocol. A session is a sequence of messages that are exchanged between two devices. In a stateless messaging protocol, the clusters communicate without saving any state information. State information may consist of protocol parameters, user or client machine identifiers, session identifiers, authentication status, and the like. For example, the hypertext transfer protocol (HTTP) is a stateless messaging protocol. Each request and response is treated as an independent communication that does not rely on information from a previous communication.

The cluster management module uses a stateless message-based protocol to obtain data needed to determine whether or not changes may be made to reconcile the databases. The cluster management module uses a set of reconciliation data structures to track, locally on each cluster, the latest and previous states of a database, the last changes made locally, and the author of the changes (e.g., system or user). The protocol relies on each cluster's set of reconciliation data structures. When a change is made to one or more databases in the primary cluster, a message may be sent to the corresponding secondary clusters that includes the current values of the primary cluster's set of reconciliation data structures so that the secondary cluster may determine whether or not the databases that are replicated between the clusters may be reconciled to a synchronous state.

Figure 1:
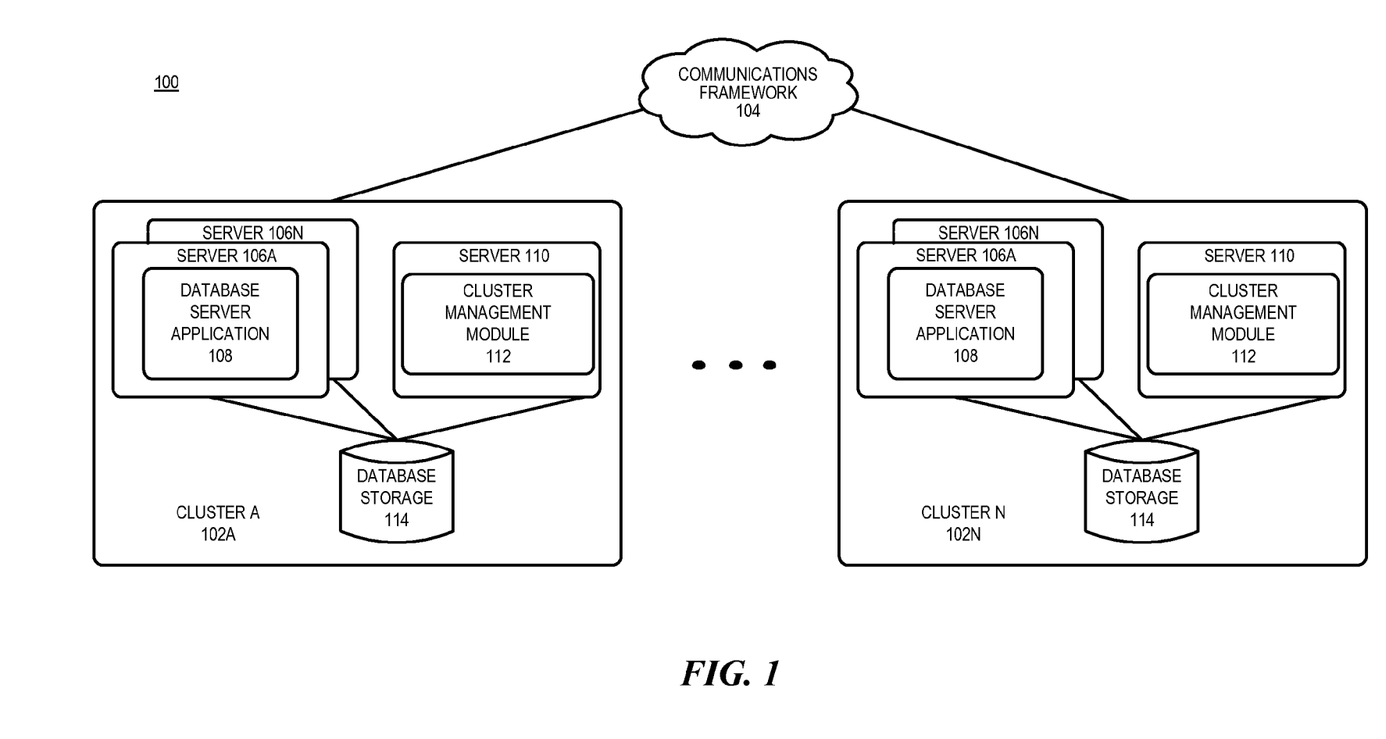
FIG. 1 is a block diagram illustrating an exemplary system utilizing geo-replicated database clusters.

Attention now turns to a discussion of a system utilizing this technology. FIG. 1 illustrates a system 100 having one or more clusters 102A-102N ("102") coupled through a communication framework 104, such as the Internet. Each cluster may be located in a separate geographic location or may be co-located. Each cluster 102 may contain one or more servers 106A-106N ("106") hosting a database server application 108. Each cluster 102 may be configured to contain at least one server 110 hosting a cluster management module 112. One or more of the servers 106, 110 may be coupled to a database storage 114 containing one or more databases.

A database is used to store data in a structured manner. A database may be structured as a relational database, an object-oriented database, a hierarchical database, a network database, and any other type of database. The database storage 114 may be implemented in one or more storage devices, one or more disk storage arrays, a storage area network, a network attached storage, a direct attached storage, and so forth. The embodiments are not limited to a particular configuration of the database storage 114.

In one or more embodiments, the database may be configured as a relational database. In a relational database, data is stored in tables. Each table is composed of rows and columns. A column is a set of values of the same data type and a row contains a sequence of values associated with a value from an associated column Each row corresponds to a record in a table. Relationships between the tables are formed in order to link data stored in the table so that the data is retrieved in an efficient manner. A primary key uniquely identifies each record in a table. A foreign key is one table's primary key stored in another table. A foreign key is used to form a link between two tables.

There are various types of relationships. A one-to-one relationship is one where both tables have one record on either side of the relationship. A primary key value in one table relates to only one record in a related table. In a one-to-many relationship, a primary key value contains only one record that relates to none, one or more records in a related table. A many-to-many relationship relates each record in both tables to any number of records in a related table. The relationships and structure of a relational database may be altered and then replicated on a related database.

The database server application 108 manages access to the data in the database storage 114. In particular, the database server application 108 controls the storage of and access to data in the database storage 114 for other software applications. In one or more embodiments, the database server application 108 may be the Microsoft SQL Server® application. However, it should be noted that the embodiments are not limited to any particular database server application and that others may be used as well.

The cluster management module 112 in each cluster tracks the reconciliation status of databases in its cluster with the corresponding databases in other clusters. Various operations affecting the state of a database may be performed either by a user or system (e.g., system or system administrator) at various points in time. The state of a database is a snap shot of the database at a particular point in time which includes without limitation the configuration of the database, the information stored in the databases, and the relationships between the database with other databases. Data within a database may be modified, the configuration of the database storage may be modified, the relational databases may be altered, and so forth. When a change or operation is made to a database or its configuration on the primary cluster, a similar change or operation may need to be made to the replicated database in order for the databases to be synchronized.

The various elements of the system 100 may be communicatively coupled through a communication framework 104. The communication framework 104 may be any type of communication medium, which is well-known in the art. In an embodiment, the communication framework 104 may include the Internet. In another embodiment, the communication framework 104 may include one or more local area networks, wide area networks, direction connections, virtual connections, private networks, virtual private networks, some combination of the above, and the like.

In one or more embodiments, the cluster management module 112 may be a sequence of computer program instructions, that when executed by a processor, causes the processor to perform methods and/or operations in accordance with a prescribed task. The cluster management module 112 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple elements, programs, procedures, modules, such as without limitation, a mobile device, a personal digital assistant, a mobile computing device, a smart phone, a cellular telephone, a handheld computer, a server, a server array or server farm, a web server, a network server, an Internet server, a tablet, a work station, a mini-computer, a mainframe computer, a supercomputer, a network appliance, a web appliance, a distributed computing system, multiprocessor systems, or combination thereof. The elements of the system may be implemented in hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Although the system 100 as shown in FIG. 1 has a limited number of elements in a certain configuration, it may be appreciated that the system 100 may include more or less elements in alternate configurations as desired for a given implementation. For example, FIG. 1 depicts a cluster having a single database shared between the servers in the cluster. In other embodiments, a cluster may be configured to have multiple databases, where each database is not shared with other servers. In addition, a database may be replicated in more than one database and the replicated databases may reside in the same or different database clusters. The embodiments are not limited in this manner.

Attention now turns to a discussion of the reconciliation determination protocol that may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

The reconciliation determination protocol determines whether or not it is possible to reconcile or synchronize the replicated databases. There are situations when operations are made locally to one database and not reconciled to the replicated database due to the unavailability of a database, either from a network failure, internal cluster failure, and so forth. In a high availability system, the unavailability may be for a limited amount of time, such as an hour, or longer due to a power loss at a data center hosting the cluster or due to the permanent loss or destruction of a data center hosting a cluster.

In this situation, a user or system administrator may force the two databases to reconcile when the unavailable database becomes operational. However, based on the amount of changes that may have been made by the operational database, it may not be possible to reconcile the state of the databases. The reconciliation determination protocol determines whether or not the state of the databases may be reconciled.

The reconciliation determination protocol may use three reconciliation data structures to represent a database: a previous state identifier, PreviousOpId; a current state identifier, CurrentOpId; and a new state identifier, NewOpId. Each reconciliation data structure may be composed of three elements: a state name; a SequenceForClusterA; and a SequenceForClusterN. The state name identifies a state, the SequenceForClusterA tracks the last change made to the database in cluster A by the system, and SequenceForClusterN tracks the last change made to the related database in cluster N by the system.

The system may automatically or through a system administrator alter the configuration of a database, or perform another operation that modifies the state of a database which may need to be replicated in the related database. The values for SequenceForClusterA and SequenceForClusterN may be integer values that are monotonically increased each time the system performs an operation on the database in a respective cluster.

A statename refers to a state which is a snapshot of a database at a particular point in time. CurrentOpId represents the current state of a database. The statename of CurrentOpId is changed each time a user performs an operation on the database. The operation may not have been reconciled with the replicated database. The sequence values associated with CurrentOpId represent operations performed by a system. When the statename of the current state is changed, its sequence values are set to zero. PreviousOpId represents a previous state immediately prior to the current state and NewOpId represents a new state. The NewOpId state may be automatically created after a user performs one or more operations on a database or created through an explicit user operation.

Initially, the CurrentOpId and the PreviousOpId are set to the same values for the primary database and the secondary database. When a user performs an operation that is not forced, the NewOpId data structure is created with a new statename and with its sequence values set to zero. When a user forces an operation to be made without reconciliation, PreviousOpId is set to the values of CurrentOpId and the statename in CurrentOpId is given a new statename with its sequence values set to zero. Although CurrentOpId represents in most cases the current reconciled state of the replicated databases, when a user forces an operation without reconciliation, the values of CurrentOpId do not represent the current reconciled state.

Figure 2:
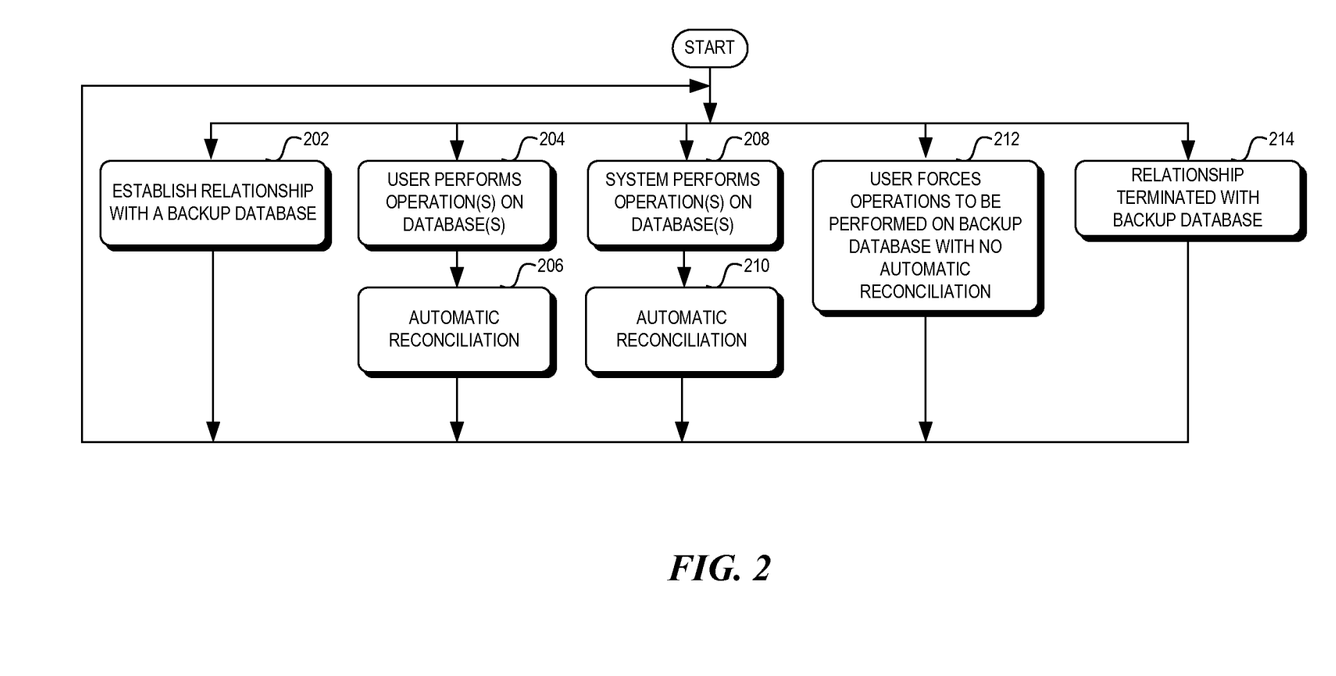
FIG. 2 is a flow diagram illustrating an exemplary method of operating in a distributed geo-replicated cluster environment.

FIG. 2 illustrates exemplary operations that may be performed by the cluster management module 112 in a cluster. The operations may be performed independently and/or concurrently by each cluster management module 112 in a cluster. A database may establish a replicated relationship with another database (block 202). The relationship may establish one database as a primary database and the other database as the secondary or backup database that replicates the primary database. The cluster hosting the primary database is referred to as the primary cluster and the cluster hosting the secondary database is referred to as the secondary cluster.

A user may perform one or more operations on the data in the primary database that may need to be replicated on a backup database located in a related cluster (block 204). The user-initiated operations may be automatically processed for replication on the backup or secondary database (block 206).

A system, either automatically or through an explicit action by a system administrator, may perform one or more operations on a database (block 208). The system-generated operations may be automatically processed for replication on the backup or secondary database (block 210).

A user may force one or more operations to be performed on a backup database when the primary database is unavailable without reconciling the operations with the primary database (block 212). In addition, the relationship with the backup database may be terminated by an explicit user or system operation (block 214).

Figure 3:
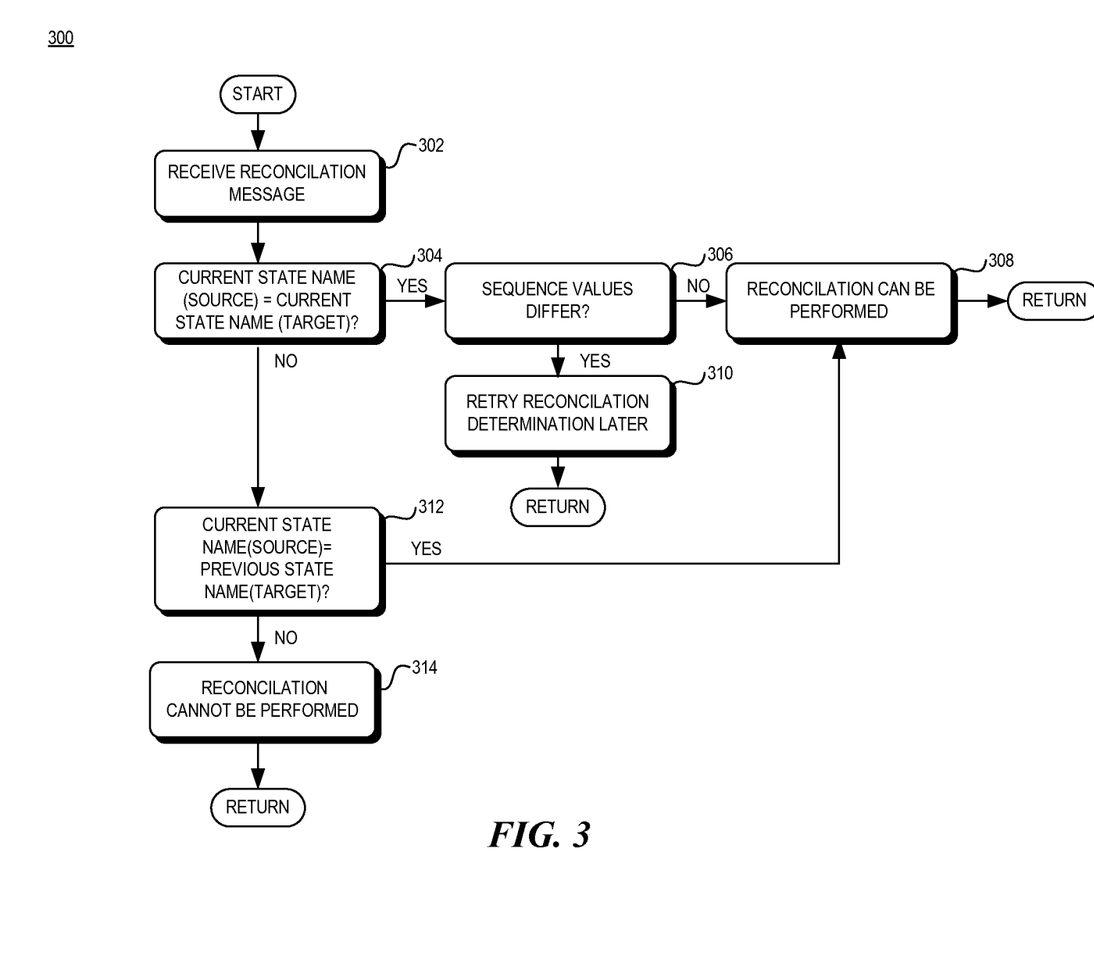
FIG. 3 is a flow diagram illustrating a first exemplary method for determining whether operations may be reconciled between replicated databases.

Turning to FIG. 3, there is shown a first embodiment of a reconciliation determination protocol 300. A cluster management module 112, in a cluster hosting a secondary database, receives a reconciliation message from a cluster management module 112 in a cluster hosting the primary database. The reconciliation message contains a new state identifier and a current state identifier (block 302). The new state identifier contains the state name of a new state that the primary database wants to reconcile with the secondary database. The current state identifier contains at least a state name, a sequence value for the primary database and a sequence value for the secondary database. In addition, the reconciliation message may also contain the data needed to perform the reconciliation which is referred to as a payload.

The cluster management module 112 on the cluster hosting the secondary database determines if the state name in the current state identifier in the message matches the state name of the current state identifier of the secondary database (block 304). When the state name in the current state identifier of the primary database matches the state name of the current state identifier of the secondary database (block 304—yes), then the databases may be synchronized to the new state. Next, a check is made to determine if the sequence values of both databases match (block 306—no). If the sequence values in the current state match, then the databases in both clusters may be reconciled (block 308)

Otherwise, if the sequence value of the current state of the primary database differs from the sequence value of the current state of secondary database (block 306—yes), then the secondary database knows that a system-generated change has been made on the primary database concurrently with a system-generated operation performed on a secondary database. In this case (block 306—yes), the reconciliation is not performed and the primary database has to try the reconciliation at a later point in time (block 310).

If the current state name of the primary database does not match the current state name of the secondary database (block 304—no), then the secondary database determines if the current state name of the primary database matches the previous state name of the secondary database (block 312). If the current state name of the primary database matches the previous state name of the secondary database (block 312—yes), then the two databases may be reconciled (block 308). Otherwise (block 312—no), the reconciliation cannot be performed (block 314).

Figure 4:
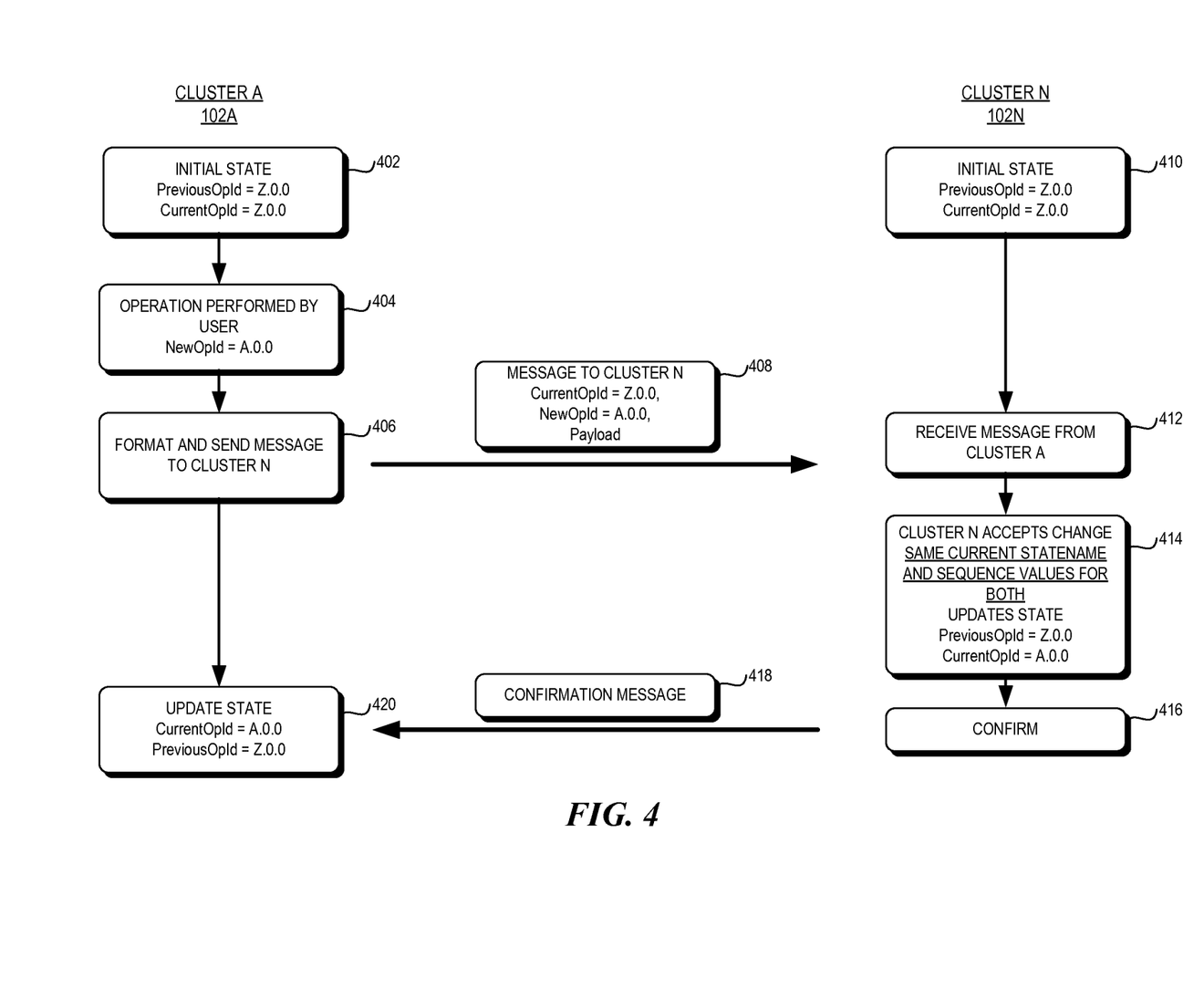
FIG. 4 is a flow diagram illustrating a second exemplary method for determining whether operations may be reconciled between replicated databases.
Figure 5:
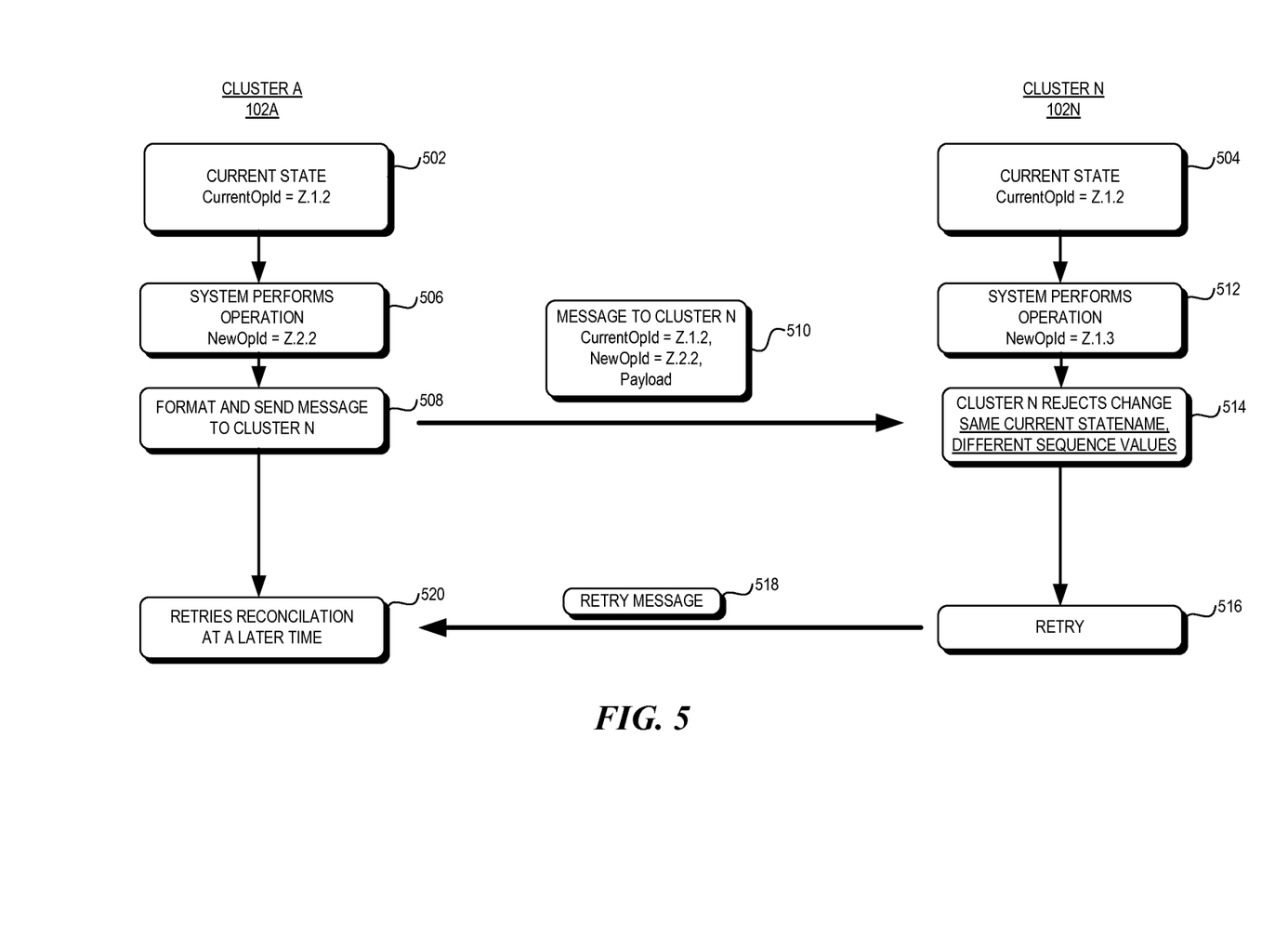
FIG. 5 is a flow diagram illustrating a third exemplary method for determining whether operations may be reconciled between replicated databases.
Figure 6:
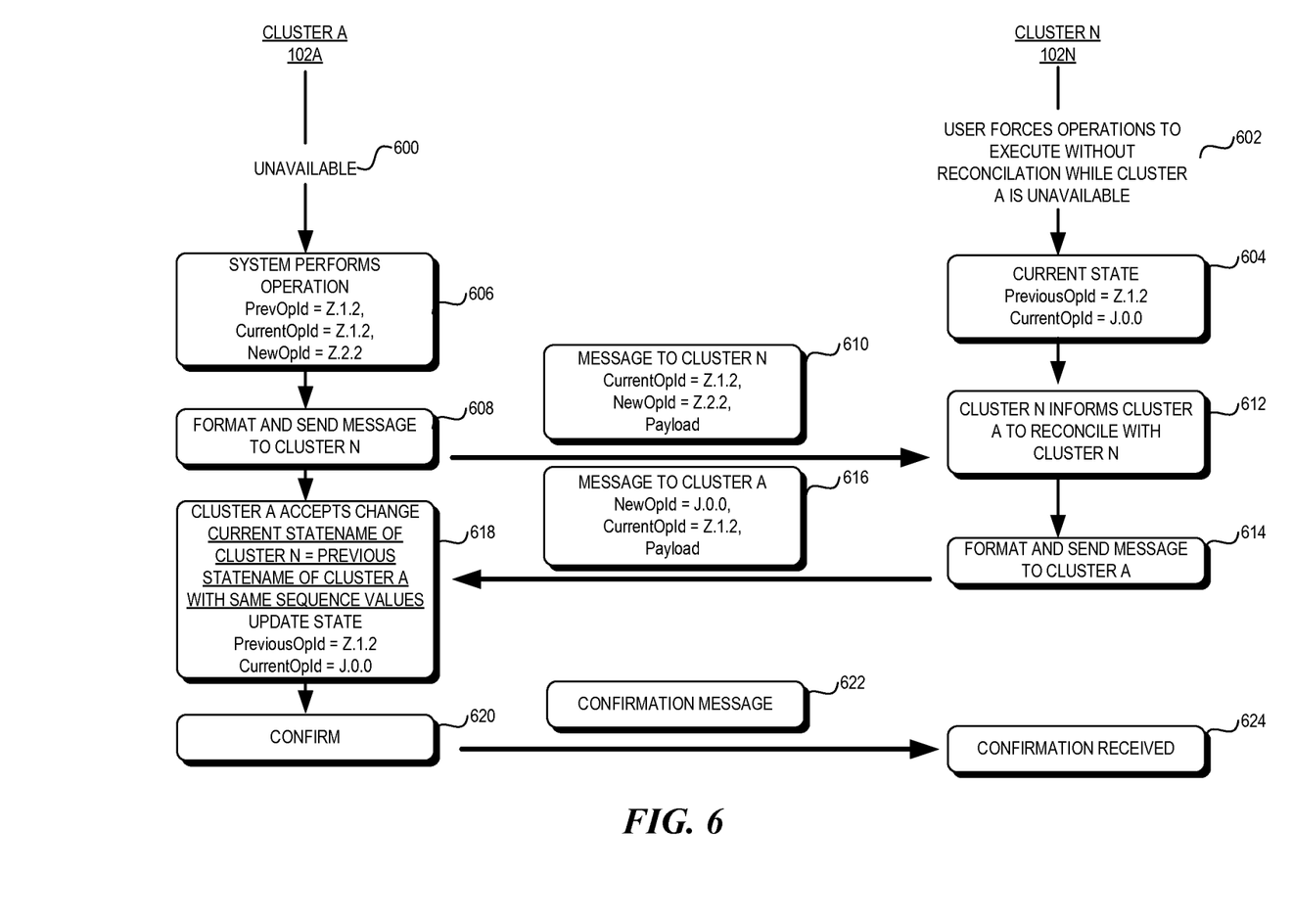
FIG. 6 is a flow diagram illustrating a fourth exemplary method for determining whether operations may be reconciled between replicated databases.
Figure 7:
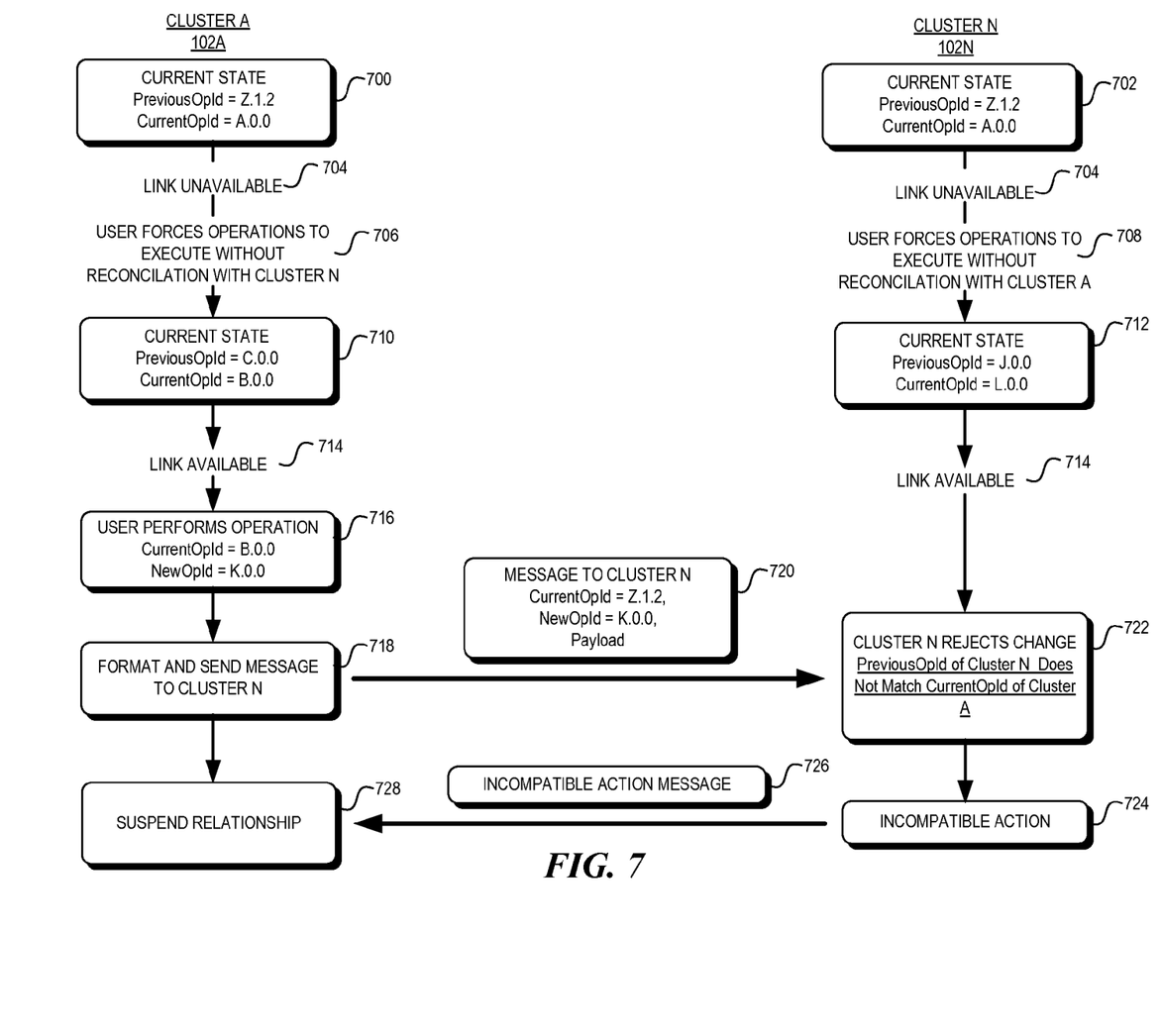
FIG. 7 is a flow diagram illustrating a fifth exemplary method for determining whether operations may be reconciled between replicated databases.

FIGS. 4-7 illustrate the reconciliation determination protocol is more detail. FIG. 4 illustrates the scenario where an operation is performed on one database which is then reconciled in the replicated database resulting in both databases being synchronized or reconciled. FIG. 5 illustrates the scenario where the system performs an operation on one cluster while the system performs an operation on the replicated cluster resulting in the change not being applied until after one of the system-initiated operations finish. FIG. 6 illustrates a scenario where a secondary or backup database takes over when a primary database becomes unavailable. When the former primary database becomes available, the system attempts to reconcile the former primary database with the backup database. FIG. 7 illustrates a scenario where a user forces operations on the secondary database without reconciling them with the primary database thereby making the secondary database the primary database. When the former primary database becomes available, the user performs an operation and an attempt is made to have the two databases reconciled.

Turning to FIG. 4, cluster A and cluster N are database clusters. The initial state of a pair of replicated databases in both database clusters has PreviousOpId=Z.0.0, where the state name=Z, SequenceForClusterA=0, and SequenceForClusterN=0 (blocks 402, 410). The CurrentOpId is set to PreviousOpId initially. A user may perform an operation on the database in cluster A which sets NewOpId=A.0.0, where the state name=A, SequenceForClusterA=0, and SequenceForClusterN=0 (block 404).

Cluster A then formats and sends a message to cluster N (block 406). The message may include the CurrentOpId, the NewOpId, and a payload describing the changes made to the database in cluster A (block 408). Cluster N receives the message from cluster A (block 412) and accepts the change based on the databases at both clusters being at the same state, which is determined by the current state having the same statename Z and sequence values (block 414). Cluster N updates its PreviousOpId to the CurrentOpId and updates its CurrentOpId to the NewOpId (block 414). Cluster N also confirms its acceptance of the change (block 416) and transmits a confirmation message to cluster A (block 418). Cluster A, upon receiving the confirmation message, updates its CurrentOpId and PreviousOpId for the database pair similarly (block 420).

FIG. 5 illustrates a scenario where reconciliation cannot be performed since the system has performed operations on the databases in both clusters concurrently. Cluster A, 102A, and cluster N, 102N, are database clusters. The current state of a pair of replicated databases in both clusters is represented by CurrentOpId=Z.1.2, where the statename=Z, SequenceForClusterA=1, and SequenceForClusterN=2 (blocks 502, 504). The system in Cluster A performs an operation locally on the database within the cluster and generates a new state, which has yet to be reconciled with the replicated database in Cluster N (block 506). Since the system has made the change, the state name is not changed. Instead, the SequenceForClusterA is increased monotonically. The new state is NewOpId=Z.2.2, where statename=Z, SequenceForClusterA=2, indicating a change has been performed locally in cluster A by the system, and SequenceForClusterN=2.

The cluster management module 112 on cluster A formats and sends a reconciliation message to cluster N (block 508). The message may include the current and new state of the database in cluster A, CurrentOpId=Z.1.2, and NewOpId=Z.2.2, and a payload containing the changes made to the database on cluster A (block 510).

The system in Cluster N performs an operation on a database locally in Cluster N and generates a new state, which has yet to be reconciled with Cluster A (block 512). Since the system has made the change, the state name is not changed. Instead, the SequenceForClusterN is increased monotonically. The new state is NewOpId=Z.1.3, where statename=Z, SequenceForClusterA=1, and SequenceForClusterN=2, indicating a change has been performed locally by the system on a database in cluster N.

The cluster management module 112 on cluster N, 102N, receives the message. The cluster management module 112 on cluster N, 102N, rejects the requested change since cluster N is currently performing a system-generated operation on the database (block 514). The cluster management module 112 determines that cluster A's NewOpId=Z.2.2 and cluster N's CurrentOpId=Z.1.2 have the same state name but different sequence values thereby indicating that a concurrent operation is being performed on the database in cluster N (block 514). The cluster management module 112 on cluster N then informs cluster A to retry the request (block 516) at a later time by sending a retry message (block 518). The cluster management module 112 in cluster A, 102A, retries the reconciliation at a later time (block 520).

FIG. 6 illustrates the scenario where a primary database has been offline or unavailable for awhile. The secondary database takes over with the user performing operations on the secondary database without reconciling the operations. When the primary database becomes available, a determination is made whether the databases within the two database clusters may be reconciled.

Turning to FIG. 6, Cluster A, 102A, and cluster N, 102N, are database clusters. A database in cluster A is replicated in a database in cluster N. Cluster A, 102A, has been unavailable for a period of time (block 602). A user may force execution of various operations on a database in cluster N, 102N, without reconciling the operations on the corresponding replicated database in cluster A (block 600). The forced operations generate a new CurrentOpID where the statename=J and the sequence values are set to zero. (block 606).

When Cluster A becomes available, the system may perform one or more operations on the database in cluster A to force reconciliation thereby generating a new state (block 604). Thus, the current state is CurrentOpId=Z.1.2, the previous state is PrevOpId=Z.1.2, and the new state is NewOpId=Z.2.2 (block 604). The previous state of Cluster N may be PrevOpId=Z.1.2, and the current state, CurrentOpId=J.0.0 (block 606).

The cluster management module 112 at cluster A formats and sends a message to cluster N (block 608) where the message to cluster N includes the current state of the database, CurrentOpId=Z.1.2, the new state, NewOpId=Z.2.2, and a payload containing the changes (block 610). The cluster management module 112 at cluster N informs cluster A to reconcile with the database in cluster N (block 612). The cluster management module 112 at cluster N formats and sends a message to cluster A (block 614) with CurrentOpId=Z.1.2, NewOpId=J.0.0, and a payload (block 616). The cluster management module 112 at cluster A accepts the changes since the previous state for the database at cluster A matches the current state of database at cluster N (block 618). The cluster management module 112 at cluster A confirms acceptance of the change (block 620) by sending a confirmation message to cluster N (block 622) which is received by the cluster management module 112 in cluster N (block 624).

FIG. 7 illustrates the scenario where a failure, such a communication link failure, has disrupted communications between the clusters. A user may force operations to be performed on one database without reconciling the operations on the related database. When the failure is resolved, an attempt is made to reconcile the two databases which in this scenario cannot occur and the relationship is terminated.

Turning to FIG. 7, Cluster A, 102A, and cluster N, 102N, are database clusters. A database in cluster A is replicated in a database in cluster N. Initially, the two database are synchronized and the current state of each database has Previous OpId=Z.1.2 and CurrentOpId=A.0.0 (blocks 700, 702). A communications link failure occurs preventing the two clusters from communicating with each other (block 704). A user may force one or more operations to execute on the database in cluster A without reconciling the changes on the replicated database in cluster N (block 706). The current state of the database in cluster A may have PreviousOpId=C.0.0 and CurrentOpId=B.0.0 (block 710). A user may force one or more operations to execute on the database in cluster N without reconciling the changes on the primary database in cluster A (block 708). The current state of the database in cluster N may have PreviousOpId=J.0.0 and CurrentOpId=L.0.0 (block 712).

The communications link becomes available at a later point in time (block 714). A user may perform an operation on the database in cluster A thereby generating newOpId=K.0.0 (block 716). The cluster management module 112 at cluster A formats and sends a message to Cluster N (block 718) that includes the current state, CurrentOpId=Z.1.2, the new state, NewOpId=K.0.0, and a payload containing the changes (block 720). The cluster management module 112 at cluster N rejects the change since too many operations have been performed on the corresponding database in cluster N for cluster N to reconcile with the database in cluster A (block 722). The cluster management module 112 determines that the request cannot be made since the PreviousOpId of Cluster N does not match the CurrentOpId of the related database in cluster A (cluster 722).

The cluster management module 112 on Cluster N then determines that the requested change is an incompatible action (block 724) and transmits an incompatible action message to cluster A (block 726). Upon receipt of the incompatible action message, the cluster management module 112 in cluster A suspends the relationship between the databases (block 728).

Figure 8:
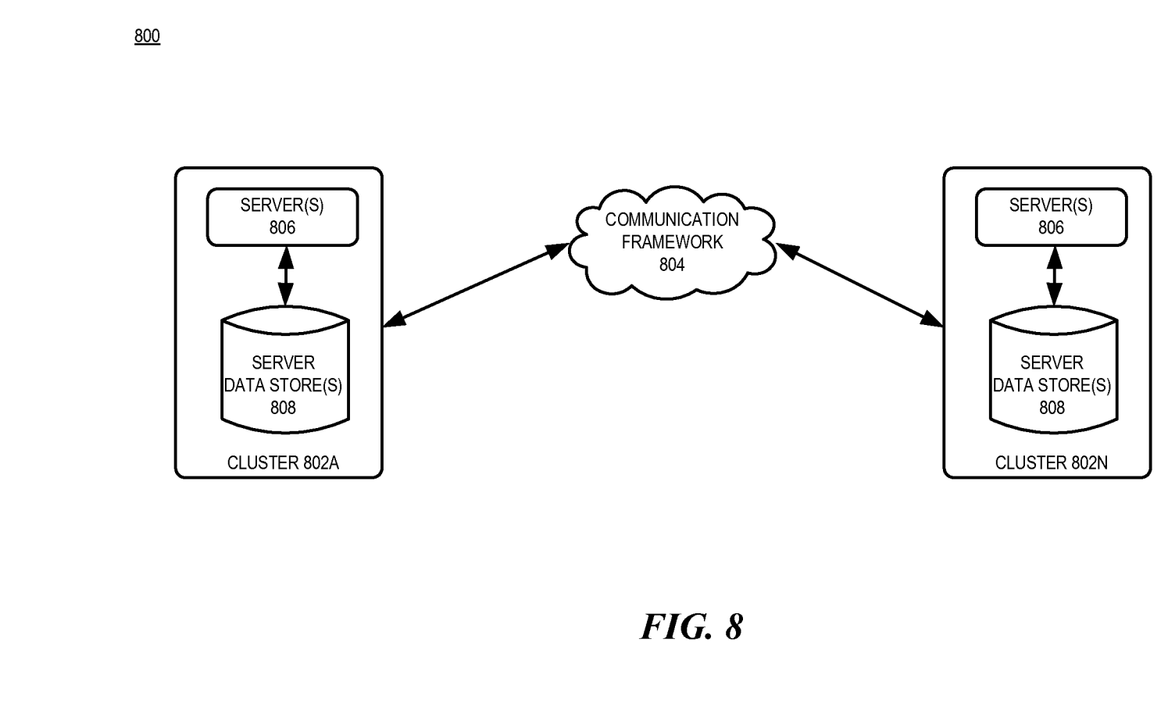
FIG. 8 is a block diagram illustrating an exemplary operating environment.

Attention now turns to a discussion of an exemplary operating environment. Referring now to FIG. 8, there is shown a schematic block diagram of an exemplary operating environment 800. The embodiments may be applied to an operating environment 800 having one or more clusters 802A-802N ("802") communicatively coupled through a communications framework 804. It should be noted that the operating environment 800 is exemplary and is not intended to suggest any limitation as to the functionality of the embodiments.

Each cluster 802 may include one or more servers 806 communicatively coupled to one or more server data stores 808. A server 806 may be embodied as a hardware device, a software module, or a combination thereof. The server 806 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The server 806 may also be embodied as a software module having instructions that execute in a single execution path, multiple concurrent execution paths (e.g., thread, process, etc.), or in any other manner. In one or more embodiments, servers 106, 110 may be implemented as server 806. Each server 806 may be communicatively coupled to other servers within a cluster 802 through any type of communication interconnect, such as a LAN, WAN, Internet, and so forth.

The communications framework 804 facilitates communications between the clusters 802. The communications framework 804 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

The server 806 may include various types of standard communication elements designed to be interoperable with the communications framework 804, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Figure 9:
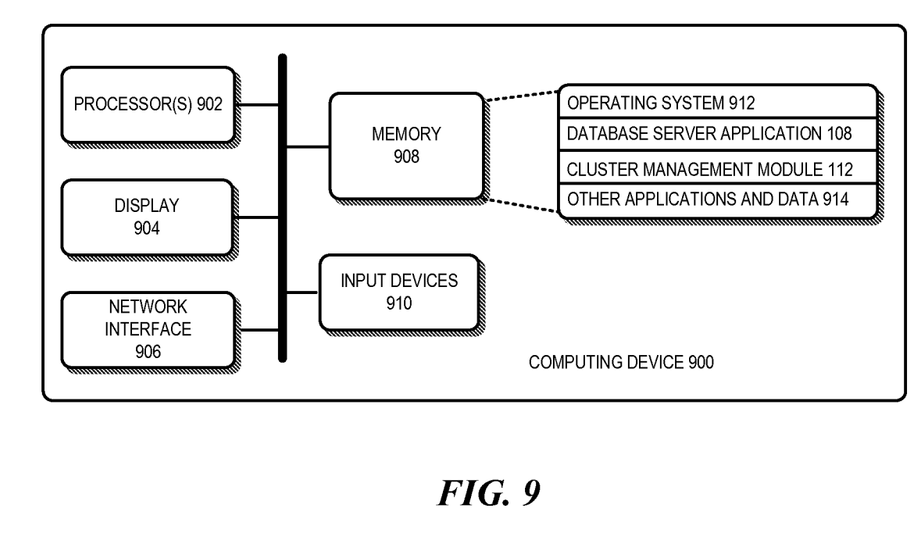
FIG. 9 is a block diagram illustrating an exemplary computing device used in the operating environment.

FIG. 9 illustrates an exemplary computing device that may be used as a server 806. The computing device 900 may have one or more processors 902, a display 904, a network interface 906, a memory 908, and I/O devices 910. A processor 902 may be any commercially available processor and may include dual microprocessors and multi-processor architectures. The display 904 may be any visual display unit and it may be embedded within a computing device or physically separated from it. The network interface 906 facilitates wired or wireless communications between the computing device 900 and a communications framework.

The memory 908 may be any type of computer-readable storage media or computer-readable storage device that stores executable procedures, applications, and data. The memory 908 may be implemented as a memory device (e.g., random access memory, read-only memory, etc.), magnetic storage, volatile storage, non-volatile storage, optical storage, DVD, CD, floppy disk drive, flash drive, and so forth and any combination thereof. The computer-readable storage media does not pertain to propagated signals, such as modulated data signals transmitted through a carrier wave. The memory 908 may also include one or more external storage devices or remotely located storage devices. The memory 908 may contain instructions and data as follows:

an operating system 912;
a database management module 108;
a cluster management module 112; and
various other applications and data 920.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for reconciling data stored on a primary database with a secondary database, the method comprising:
   tracking a current state identifier of the primary database that identifies a last reconciled state with the secondary database, a last system change made in the primary database, and a last system change made in the secondary database;
   transmit a request to reconcile changes in the primary database with the secondary database, the request including the current state identifier and a payload; and
   receiving confirmation that the primary database has been synchronized with the secondary database, when the current state identifier of the primary database matches a current state identifier of the secondary database and no system operations have been performed on the primary database or the secondary database since a last reconciliation,
   wherein the current state identifier of the secondary database identifies a last reconciled state with the primary database, a last system change made in the primary database, and a last system change made in the secondary database by a system.

2. The method of claim 1, further comprising:
   generating a new state identifier when a user performs an operation on the primary database that is not reconciled with the secondary database; and
   wherein the transmission of the current state identifier includes the new state identifier,
   wherein the new state identifier is used to update the current state identifier of the secondary database.

3. The method of claim 1, further comprising:
   updating a previous state identifier of the primary database with the current state identifier of the primary database, the previous state identifier of the primary database representing a state prior to the current state identifier; and
   updating the current state identifier of the primary database with the new state identifier of the primary database.

4. The method of claim 1, further comprising:
   delaying reconciliation of the primary database with the secondary database when a current state identifier of the primary database matches the current state identifier of the secondary database data and there is at least one system operation performed on the primary database or the secondary database since the last reconciliation.

5. The method of claim 1, wherein the payload contains changes made on the primary database since a last reconciliation state.

6. The method of claim 1, further comprising:
   receiving a new state identifier of the secondary database, a current state identifier of the secondary database, and a payload not reconciled in the primary database;
   when the received current state identifier of the secondary database matches a previous state identifier of the primary database, updating the primary database with the payload.

7. The method of claim 6, further comprising:
   updating a previous state identifier of the primary database with the current state identifier of the secondary database and the current state identifier of the primary database with the new state identifier of the secondary database.

8. The method of claim 1 wherein the primary database is hosted on a primary database cluster and the secondary database is hosted on a secondary database cluster, the primary database cluster located in a same geographic location as the secondary database cluster.

9. The of claim 1 wherein the primary database is hosted on primary database cluster and the secondary database is hosted on a secondary database cluster, the primary database cluster located in a different geographic location as the secondary database cluster.

10. A system, comprising:
    a primary database cluster and a secondary database cluster; and
    the primary database cluster having at least one processor and a memory;
    the at least one processor configured to:
    establish a relationship between a primary database in the primary database cluster and the secondary database in the secondary database cluster that allows a user to perform one or more operations on the primary database and on the secondary database concurrently and independently;

track a current state identifier and a previous state identifier for the primary database, the current state identifier represents a last reconciled state with the secondary database and a last system change made in the primary database, and a last system change made in the secondary database;

reconcile operations performed on the primary database with the secondary database based on a current state identifier of the primary database and the current state identifier of the secondary database; and reconcile operations performed on the secondary database with the primary database based on a current state identifier of the secondary database and a previous state identifier of the primary database.

11. The system of claim 10, wherein the at least one processor is further configured to:

transmit a first message to the secondary database requesting reconciliation with the primary database after the primary database has been unavailable;

receive a second message from the secondary database including the current state identifier of the secondary database and a payload; and reconcile the primary database with the payload when the current state identifier of the secondary database matches the previous state identifier of the primary database.

12. The system of claim 10, wherein the at least one processor is further configured to:

transmit a first message to the secondary database requesting reconciliation, the first message including the current state identifier of the primary database; and receive a second message from the secondary database rejecting the reconciliation request when a previous state identifier of the secondary database does not match the current state identifier of the primary database.

13. The system of claim 12, wherein the at least one processor is further configured to:

suspend the relationship between the primary database and the secondary database.

14. The system of claim 10, wherein the current state identifier of the primary database includes a statename, a first sequence value and a second sequence value, the statename identifying a current reconciled state of the primary database, the first sequence value identifying a last system change made in the primary database, and the second sequence value identifying a last system change made in the secondary database; and wherein the at least one processor is further configured to:

transmit a first message to the secondary database requesting reconciliation, the first message including the current state identifier of the primary database; and receive a second message rejecting the reconciliation request when the statename of the current state identifier of the primary database matches the statement of the current state identifier of the secondary database, the first sequence value of the current state identifier of the primary database does not match the first sequence value of the current state identifier of the secondary database, and second sequence value of the current state identifier of the primary database does not match the second sequence value of the current state identifier of the secondary database.

15. The system of claim 10 wherein the primary database cluster and the secondary database cluster are in different geographic regions.

16. A device, comprising:

at least one processor and a memory;

the at least one processor configured to:

establish a relationship with a first database so that the first database and the second database are synchronized;

track operations performed on the second database using a current state identifier, the current state identifier associated with a last reconciled state with the first database, a last system change made in the first database, and a last system change made in the second database;

receive a first message requesting reconciliation between a first database and a second database, the first message including a current state identifier of the first database and a payload; and incorporating the payload into the second database when the current state identifier of the first database matches the current state identifier of the second database.

17. The device of claim 16, wherein a current state identifier includes a statename, a first sequence value and a second sequence value, the statename identifying a current reconciled state, the first sequence value identifying a last system change made in the first database, and the second sequence value identifying a last system change made in the secondary database, and wherein the at least one processor is further configured to:

receive a second message requesting reconciliation, the second message including the current state identifier of the first database; and transmit a response to retry the reconciliation at a later time when the statename of the current state identifier of the first database matches the statename of the current state identifier of the second database, the first sequence value of the current state identifier of the first database does not match the first sequence value of the current state identifier of the second database, and the second sequence value of the current state identifier of the first database does not match the second sequence value of the current state identifier of the second database.

18. The device of claim 16, wherein the at least one processor is further configured to:

receive a second message including a current state identifier of the first database; and transmit a response including the current state identifier of the second database and a payload, wherein the first database is updated with the payload when the current state identifier of the second database matches the previous state identifier of the first database.

19. The device of claim 16, wherein the at least one processor is further configured to:

receive a second message requesting reconciliation including a current state identifier of the first database; and transmit a response rejecting the reconciliation request when a previous state identifier of the second database does not match the current state identifier of the first database.

20. The device of claim 16, wherein the first database and the second database are located in different geographic locations.

* * * * *